H. G. HEROLD.
TRIAL FRAME FOR OPTICAL TESTING PURPOSES.
APPLICATION FILED DEC. 27, 1912.
1,096,169.
Patented May 12, 1914.
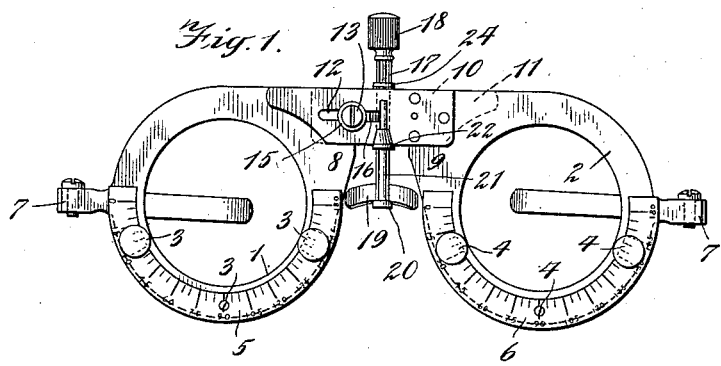
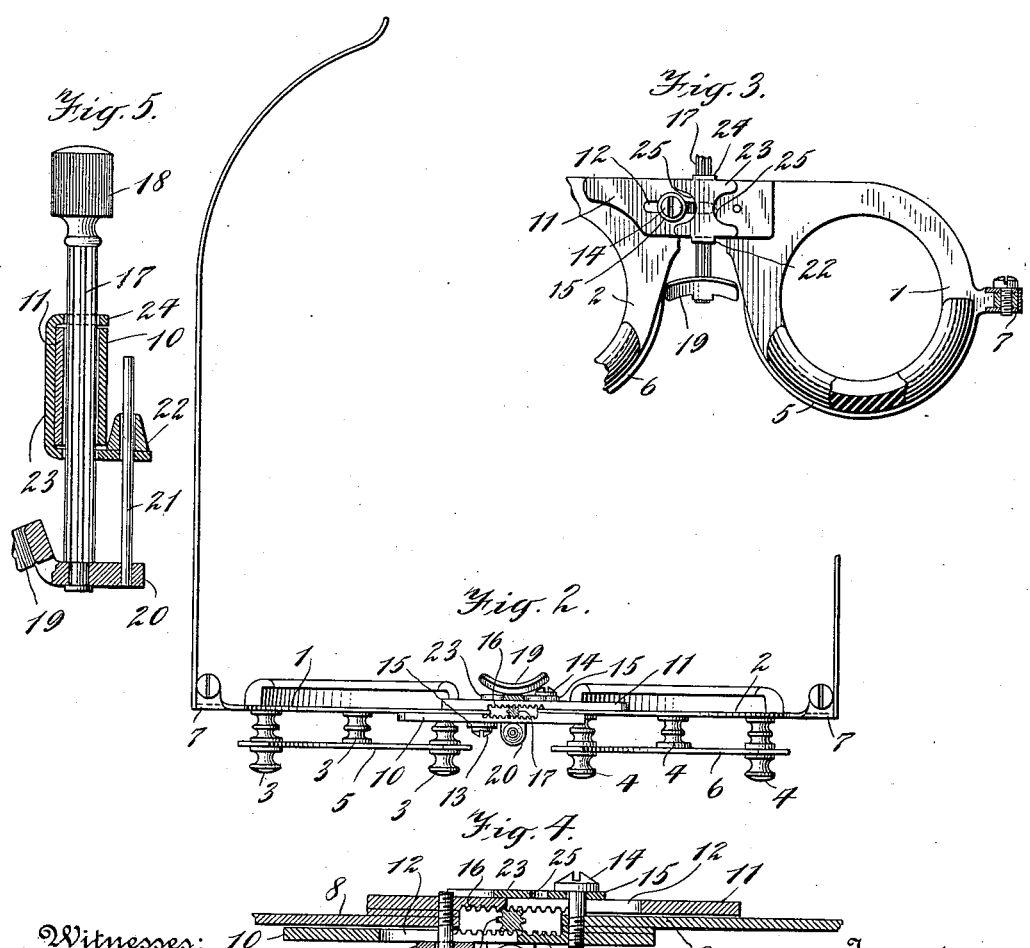

UNITED STATES PATENT OFFICE.

HARRY G. HEROLD, OF HASBROUCK HEIGHTS, NEW JERSEY, ASSIGNOR TO THE MEYROWITZ MANUFACTURING CO., A CORPORATION OF NEW JERSEY.

TRIAL-FRAME FOR OPTICAL TESTING PURPOSES.

1,096,169. Specification of Letters Patent. Patented May 12, 1914.

Application filed December 27, 1912. Serial No. 738,804.

*To all whom it may concern:*

Be it known that I, HARRY G. HEROLD, a citizen of the United States, residing at Hasbrouck Heights, in the county of Bergen and State of New Jersey, have invented certain new and useful Improvements in Trial-Frames for Optical Testing Purposes, of which the following is a full, clear, and exact description.

This invention relates to trial frames for optical testing purposes.

One of the objects of the invention is to provide a trial frame capable of lateral and vertical adjustment and a common operating means to effect these adjustments.

A still further object is to provide a device which while rigid and durable in construction may yet be made of light metal.

With the above objects in view, the invention consists in the features of construction, arrangement of parts, and combination of elements herein set forth and claimed.

Referring to the accompanying drawing, wherein is shown one of the embodiments of the invention, Figure 1 represents a front elevation of the device; Fig. 2 represents a plan view thereof; Fig. 3 represents a partial rear view of the device, a portion being shown in section; Fig. 4 represents an enlarged detail view showing a sectional plan view of the adjustment means; and Fig. 5 represents an enlarged detail view showing the adjustable nose-piece mounted on the pinion and the vertical guide to prevent the rotation of the nose-piece.

Similar reference numerals designate similar parts in all the views of the drawing.

Referring now more particularly to the drawing, 1 and 2 designate substantially circular rims of the trial frame providing the usual apertures. Upon the rims are mounted the projecting studs 3 and 4, which in turn support the semi-circular graduated strips 5 and 6 in the usual manner. The rims are provided with the usual temple-pieces 7 attached to either side thereof. The rims and other portions of the device hereinafter mentioned are preferably made of light metal. As seen in Fig. 1, the upper adjacent portions of the rims 1 and 2 are provided with squared portions 8 and 9. The two rims are provided with slightly offset extensions formed integrally with or attached in any convenient manner to the portions 8 and 9. By means of these extensions the rims are attached to one another in a manner hereinafter set forth. Attached to the front face of the squared portion 9 is a substantially rectangular extending plate 10, forming an extension which overlies the front face of the rim 1 including the squared portion 8. Attached to the rear face of the squared portion 8 is a substantially rectangular extending plate 11 which overlies the rear face of the rim 2 including the squared portion 9. The plates are each provided at their outer extremities with curved portions corresponding to the curves of the apertures in the rims, so that when the rims are in retracted position as hereinafter set forth, the extremities of the plates will not interfere with these apertures. The plates 10 and 11 are provided with slots 12 which extend approximately from the centers thereof toward the outer unattached extremities. A screw 13 passes rearwardly through the slot in plate 10 and is firmly attached to the portion 8. A screw 14 passes forwardly through the slot in plate 11 and is firmly attached to portion 9. The screws 13 and 14 are provided with washers 15 lying between the heads of the screws and the faces of the plates. The screws 13 and 14 thus hold the plates and thereby the rims in movable engagement with one another, movement being permitted by virtue of the slots 12. These two plates thus form a connection between the rims and join the latter together in a manner such that the rims may be moved toward and away from one another by mechanism hereinafter set forth, to adjust the position of the lenses held on the rims with respect to the interpupillary distance of the patient whose eyes are being examined. The direct connection of the parts as mentioned provides a strong, durable structure.

In the present embodiment, a part of the adjustment means for moving the rims toward and away from one another is also used to make the vertical adjustments of the rims with respect to the nose-piece. This double use of a single adjusting means is permitted through the employment of a rack and pinion construction for moving the rims to and fro by mounting the nose-piece on the pinion and permitting relative movement between the pinion with its attached nose-piece and the remainder of the frame.

As shown more clearly in Fig. 4, the rear face of plate 10 and the front face of plate 11 are provided with racks 16 which extend the full width of the plate. These racks extend on either side of the center line of the plates and their total length is slightly less than the length of the slots 12. The racks are thus oppositely disposed and in view of their positions on the plates 10 and 11, they are spaced sufficiently far apart by virtue of the off-set position thereof to permit a shaft 17 provided with teeth arranged on the periphery thereof and extending throughout the length thereof, to fit therebetween. The shaft serves as a pinion and its teeth engage with the teeth of the racks to thereby move the plates 10 and 11 as indicated. According to this construction, the shaft may be moved with respect to the rims, or vice versa, in a direction along the longitudinal axis of the shaft. The upper portion of the shaft is provided with a milled head 18 whereby the shaft may be conveniently turned by the fingers. The lower end of the shaft is provided with a nose-piece 19, through a tail-member 20 of which passes the extremity of the shaft. The shaft is loosely riveted to this tail-piece so that it may turn with respect thereto. In thus mounting the shaft, of course there is a chance that through frictional engagement of the shaft with the tail-piece, the latter might rotate if no provision were made to insure against this. Provision is, however, made in the form of a guide-rod, 21, arranged parallel to the shaft and securely attached to the tail-piece 20 at one end. This guide-rod moves up and down with respect to the rims and is guided in its motion by an arm 22 provided with a bearing, the arm forming part of a U-shaped rider member. The arm 22 and bearing have apertures through which the guide 21 passes. The rider has a flat body portion 23 which moves along the rear face of the plate 11 and an arm 24. The arms 22 and 24 are sufficiently far apart to embrace the plates 10 and 11 therebetween, and are of sufficient length to project over the upper and lower edges, respectively, at these plates and are provided with alined apertures through which the shaft 17 extends. It will be seen that the guide 21 which is attached to the nose-piece and passes through the arm of the rider is thus held from rotation and thereby holds the nose-piece from rotation. The body 23 of the rider is provided with semi-circular cut-out portions 25, one of which permits the head of the screw 14 to pass there-into when the rims are forced toward each other. When the rims are in extreme closed position, just sufficient space is left between the corners of the squared portions to permit the shaft 17 to rest conveniently therebetween.

The operation of the device, which should be largely obvious from the foregoing, is as follows:—The trial frame is placed in the usual position on the patient and the adjustment for the interpupillary distance may then be made by rotating the shaft 17 through the head 18 whereby the rims 1 and 2 with the lenses placed therein are moved laterally away from or toward each other. This lateral adjustment may be made while the nose-piece is in place on the nose of the patient without inconvenience to him, by virtue of the fact, as mentioned above, that the nose-piece is prevented from rotation. When the lateral adjustment has been made, the position of the rims may be adjusted up and down so as to bring the centers of the rims opposite the centers of the eyes of the patient. When the frame is in position on the face of the patient, the adjustment may be conveniently accomplished by moving the rims down or up, or more specifically, toward or away from the nose-piece. It will be noted that both of the adjustments mentioned, namely, the lateral and vertical adjustments may be made through the head 18. It will thus be seen that a practical, durable device is provided which accomplishes among others the objects heretofore set forth.

As many apparently widely different embodiments of this invention could be made without departing from the scope thereof, it is intended that all matter contained herein and shown in the accompanying drawing shall be interpreted as illustrative and not in a limiting sense.

Having thus described my invention, I claim:—

1. In a trial frame for optical purposes, laterally and vertically adjustable lens-holding members, and a common operating member to laterally and vertically adjust said lens-holding members.

2. In a trial frame for optical purposes, adjustable rims having extensions forming a connection between said rims, and a member co-acting with said extensions adapted to move said rims, said member being movable in a direction transverse to the motion of said rims and being provided with a nose-piece.

3. In a trial frame for optical purposes, adjustable rims having extensions provided with racks and a pinion co-acting with said racks to move said rims toward and away from one another, said pinion being adjustable in a direction transverse to the motion of said rims, and a nose-piece attached to said pinion.

4. In a trial frame for optical purposes, adjustable rims having extensions provided with racks, a pinion between said racks, said pinion co-acting with said racks to adjust said rims in accordance with the interpupillary distance of a patient, and a nose-piece attached to the extremity of said pinion, said rims being movable substantially vertically when positioned upon a patient's face and thereby permitting the adjustment of said rims with respect to the centers of the eyes of the patient.

5. In a trial frame for optical purposes, adjustable rims having extensions provided with racks, a pinion co-acting upon rotation with the racks to move said rims away from and toward each other, a nose-piece attached to said pinion, the position of said rims being substantially vertically adjustable with respect to said nose-piece when in position upon the patient's face, and a sliding guide co-acting with said nose-piece to prevent rotation thereof upon rotation of said pinion.

6. In a trial frame for optical purposes, adjustable rims provided with plates, each plate overlying the surface of the opposite rim, slidably attached thereto and having a rack, a toothed shaft between said plates, a nose-piece loosely mounted on the extremity thereof, said shaft being movable longitudinally with respect to the teeth of said racks, said nose-piece having a sliding guide-rod attached thereto, an arm having an aperture through which said rod slides, said rod being adapted to thereby prevent the rotation of said nose-piece upon rotation of said toothed shaft.

In witness whereof, I subscribe my signature, in the presence of two witnesses.

HARRY G. HEROLD.

Witnesses:
WILLIAM N. COOK,
JAS. E. CAREY.

Copies of this patent may be obtained for five cents each, by addressing the "Commissioner of Patents, Washington, D. C."